United States Patent [19]
Bogdanovic et al.

[11] Patent Number: 5,498,402
[45] Date of Patent: Mar. 12, 1996

[54] METAL-MAGNESIUM COMPOUNDS

[75] Inventors: Borislav Bogdanovic; Ursula Wilczok, both of Mülheim/Ruhr, Germany

[73] Assignee: Studiengesellschaft Kohle mbH, Mulheim/Ruhr, Germany

[21] Appl. No.: 322,254

[22] Filed: Oct. 13, 1994

Related U.S. Application Data

[62] Division of Ser. No. 734,365, Jul. 22, 1991, Pat. No. 5,385,716.

[30] Foreign Application Priority Data

Jul. 31, 1990 [DE] Germany .......................... 40 24 205.6

[51] Int. Cl.⁶ ....................................................... C01B 9/00
[52] U.S. Cl. .................................................................. 423/463
[58] Field of Search ............................................. 423/463

[56] References Cited

U.S. PATENT DOCUMENTS

| | | |
|---|---|---|
| 3,179,490 | 4/1965 | Musinski et al. . |
| 3,488,144 | 1/1970 | Sargent ............................ 423/463 |
| 3,741,749 | 6/1973 | Jochmann et al. . |
| 4,713,110 | 12/1987 | Bogdanovic et al. . |
| 4,828,606 | 5/1989 | Bogdanovic et al. . |

FOREIGN PATENT DOCUMENTS

| | | |
|---|---|---|
| 845338 | 7/1952 | Germany . |
| 921986 | 1/1955 | Germany . |
| 785348 | 10/1957 | United Kingdom . |

OTHER PUBLICATIONS

Patent Abstracts of Japan, V. 11, No. 185 JP-A-62 010 229 (1987), Katsutoshi et al.

*Primary Examiner*—Wayne Langel
*Attorney, Agent, or Firm*—Sprung Horn Kramer & Woods

[57] ABSTRACT

The present invention relates to metal-magnesium compounds, a process for preparing same and the use thereof, especially for the preparation of finely divided, possibly amorphous, metal and alloy powders and/or of intermetallic compounds, both procedures via a non-metallurgical route in organic solvents under mild conditions.

3 Claims, 2 Drawing Sheets

METAL-MAGNESIUM COMPOUNDS

This application is a continuation or divisional, of application Ser. No. 07/734,365, filed Jul. 22, 1991, now U.S. Pat. No. 5,385,716.

The present invention relates to metal-magnesium compounds, a process for preparing same and the use thereof, especially for the preparation of finely divided, possibly amorphous, metal and alloy powders and/or of intermetallic compounds, both procedures via a non-metallurgical route in organic solvents under mild conditions.

Metal alloys and/or intermetallic compounds are usually prepared by metallurgical processes. Metal powders in a finely divided highly reactive form are obtained according to DE 35 41 633 (Studiengesellschaft Kohle, 1987) by reacting metal salts in a solvent with magnesium powder which has been admixed with a catalytic amount of anthracene and/or of magnesium anthracene or one of the derivatives thereof as an acivator. According to the DE 36 13 532 (Studiengesellschaft Kohle, 1987) there has been known a process for the preparation of finely divided, possibly amorphous, intermetallic compounds and the hydrides thereof, wherein hydrides of the elements of the Main Groups I to IV of the Periodic Table, hydridemagnesium halides or magnesium dialkyls in an organic solvent are reacted with bisallylmetal compounds of the metals of the Subgroup VIII of the Periodic Table or of zinc. A recently described method for the preparation of finely divided metal and alloy powders {H. Bönnemann et al., Angew. Chem. 102 (1990), 324} consists of the reduction or co-reduction of metal salts in an organic phase by means of alkali metal or alkaline earth metal organohydridoborates.

Now, surprisingly a new process was found for the preparation of metal-magnesium compounds ($M^1$-Mg-compounds), and by employing these, of metal and alloy powders or of intermetallic or metal-element compounds ($M^1$, $M^1M^2$, $M^1M^2M^3$...) in a finely divided highly reactive and possibly amorphous form. The new process relating to $M^1$-Mg-compounds is characterized in that halides of the metals of the Groups IIIA-VA, VB-VIIB, VIII, IB and IIB of the Periodic Table ($M^1X_m$), or optionally the metals $M^1$ or $M^1$-hydrides, are reacted in an organic solvent with magnesium hydride ($MgH_2$), hydridemagnesium halides (HMgX), organomagnesium compounds and/or metallic magnesium, if desired in the presence of anthracene or its derivatives, magnesium anthracene 3 THF (MgA) or its derivatives, magnesium halides, organic halides and/or quinuclidine as activators. Tetrahydrofurane (THF) is deemed to be the preferred solvent. The metals $M^1$ are preferred to be employed in a finely divided highly reactive form, while it is desirable that the magnesium component used has preferably been dissolved or partially dissolved in an organic solvent, or that an insoluble magnesium component (e.g. magnesium powder) is employed in the presence of said activators. As the $MgH_2$, there is preferably employed the catalytically prepared $MgH_2$ ($MgH_2^*$; European Patent 3564, Studiengesellschaft Kohle, 1982) or the catalytically prepared dissolved $MgH_2$ ($MgH_2'$; DE 37 22 993, Studiengesellschaft Kohle, 1989). As the preferred organomagnesium compounds, there are contemplated $C_1$–$C_{12}$-alkylmagnesium halides, di-$C_1$-$C_{12}$-alkylmagnesium compounds, MgA or its alkyl or aryl derivatives and/or $Mg_2Cl_3(THF)_6^{\oplus}$-anthracene$^{\ominus}$.

It is considered a pre-requisite for the preparation of $M^1$-Mg compounds from metal halides $M^1X_m$ according to the present invention that an excess of the magnesium compound is employed relative to the quantity required for reducing $M^1X_m$ to the metal level $M^1$ or to form a $M^1$ hydride. Namely, in this procedure, part of the Mg component is consumed for the reduction of $M^1X_m$ to the metal stage or for the formation of $M^1$ hydride, whereas the excess of the Mg-component reacts with the metal $M^1$ or with the $M^1$ hydride in statu nascendi to form the $M^1$-Mg compound. Therefrom it ensues that in the reaction of $M^1X_m$ with the Mg component, depending on the molar ratio of $M^1X_m$:magnesium component and on the reaction conditions, both $M^1$ or $M^1$ hydride $M^1$-Mg compounds in admixture with $M^1$ or $M^1$ hydride and $M^1$-Mg compounds alone may be formed. Nevertheless, the preparation of $M^1$-Mg compounds may also be carried out in two steps, if so desired, wherein first $M^1X_m$ with the Mg component, is reduced to the metal level $M^1$ or converted into the $M^1$ hydride, and then the resulting $M^1$ or $M^1$ hydride, which is present in a finely divided highly reactive form, is subsequently reacted with a further amount of the Mg component in a solvent, or in the solid state by means of a subsequent thermal treatment, to form the $M^1$-Mg compound.

In the reaction of $M^1X_m$ (or of $M^1$) with the Mg components mentioned according to the present process, the types a.–d. listed hereinbelow of $M^1$-Mg compounds may be formed depending on the kind of $M^1X_m$ (or of $M^1$) and of the Mg component and on the molar ratio and reaction conditions employed:

a. intermetallic Mg compounds or Mg alloys ($Mg_xM^1y$);
b. intermetallic Mg hydrides ($Mg_xM^1_yH_p$), carbides ($Mg_xM^1_yC_q$) and hydride-carbides ($Mg_xM^1_yH_pC_q$);

the $M^1$-Mg compounds listed in a. and b. comprise known compounds of the respective types as well as compounds hitherto unknown. It is characteristic for the instant process that the resulting compounds are formed in a highly reactive, finely divided and possibly X-ray amorphous form.

Of special novelty is the finding that according to the present process there can be formed not only solid intermetallic Mg compounds or Mg alloys, but in many cases also the hitherto unknown THF-soluble $M^1$-Mg compounds, namely the THF-soluble $M^1$-Mg halides (Type c.), and the THF-soluble $M^1$-Mg (hydride)halides (Type d.).

It has further been found that the Mg in the $M^1$-Mg compounds preparable according to the present process may be replaced by an alien metal or element M or by two or more alien metals or elements ($M^2$, $M^3$...) by allowing $M^1$-Mg compounds to react with $M^2$ halides ($M^2X_n$) or with a mixture of $M^2$ and $M^3$ halides, preferably in a solvent. Thus, in combination with the method presented for the preparation of $M^1$-Mg compounds of the types a. through d., for the first time there ensues a purposeful two-step synthesis of intermetallic compounds as well as metal-element compounds or metal alloys ($M^1M^2$, $M^1M^2M^3$, ...) under mild conditions ("cold metallurgy") and without employing the otherwise conventional, expensive metallurgical processes. The preparation of ($M^1M^2$) in accordance with this two-step synthesis may be described by the following equations:

1st Step:

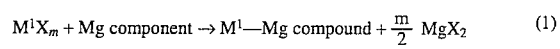

$$M^1X_m + Mg \text{ component} \rightarrow M^1\text{—Mg compound} + \frac{m}{2} MgX_2 \quad (1)$$

3
-continued

Optional 1st Step:

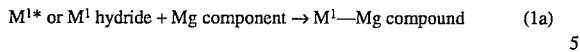
M¹* or M¹ hydride + Mg component → M¹—Mg compound (1a)

2nd Step:

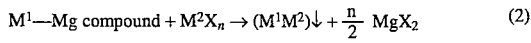
M¹—Mg compound + M²X$_n$ → (M¹M²)↓ + $\frac{n}{2}$ MgX$_2$ (2)

If so desired, the preparation of (M¹M²) according to this method may be carried out also in one step (Example 22a) by allowing to react M¹X$_m$ with the magnesium component in the presence of M²X$_n$.

For the preparation of M¹M², M¹M²M³ according to the presented method there may also be employed the M¹-Mg compounds preparable according to the DE 36 13 532 (Studiengesellschaft Kohle, 1987).

If, according to the presented method, the M¹-Mg compounds are reacted with M¹X$_m$, then the metals M¹ are obtained in a finely divided highly reactive form:

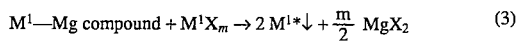
M¹—Mg compound + M¹X$_m$ → 2 M¹*↓ + $\frac{m}{2}$ MgX$_2$ (3)

The preparation of the M¹-Mg compounds a through d. and the use thereof for the production of metal and alloy powders and of intermetallic compounds (M¹, M¹M², M¹M²M³) is furnished evidence of by the Examples 1 through 41, while it is not limited thereto. Examples for the preparation of M¹Mg compounds according to Equation 1 have been set forth in the Tables 1 to 4 and 4a, and examples for the preparation of metal alloys (M¹M²) according to Equation 2 and of the metal powders (M¹*) according to Equation 3 have been set forth in the Tables 5 and 5a.

The soluble or insoluble M¹-Mg compounds preparable according to the instant process may be used as, inter alia, homogeneous or heterogeneous catalysts, as starting materials for the preparation thereof or for the preparation of organometallic M¹ compounds. Thus, for example, the Mg-Sn, Mg-Pb and Mg-Ga alloys accessible according to the process may be employed as starting material for the preparation of organotin compounds (herbicides, pesticides), organolead compounds (knock inhibitors) and organogallium compounds (Ga, As, photovoltaic cells). The intermetallic Mg hydrides (compounds of type b.) and especially the THF-soluble M¹-Mg (hydride)halides (type d.) such as, e.g., Fe(HMgCl)$_2$ (Example 21) may be used as reducing agents for functional organic compounds such as, e.g., esters, ketones, aldehydes, halides and the like. The solid M¹-Mg compounds may find use as metal and alloy powders in the powder technology (e.g. Mg$_2$Cu), and the hydrides and carbides thereof may find use as reversible hydrogen and heat storage media, where it is an advantage that according to the instant process they are obtained in a highly active, finely divided and often X-ray amorphous form. Besides the M¹-Mg compounds according to Equations 2 and 3 are employed as starting materials for the preparation of metal and alloy powders (M¹, M¹M², M¹M²M³ . . . ) in a finely divided, highly reactive form The metal and alloy powders (M¹, M¹M², . . . ) are also usable in powder technology and especially as heterogeneous catalysts (e.g. FeCu, Example 21, as catalyst for the Fischer-Tropsch synthesis).

The advance in the art constituted by the instant process is also due to the fact, besides other reasons, that intermetallic M¹-Mg compounds and alloy powders (M¹M² , . . . ) have become accessible which according to the hitherto common metallurgical procedures could be produced not at all or only at a higher expenditure. Thus, for example, the intermetallic compound Mg$_2$Pd (Example 12) which reversibly reacts with hydrogen is hardly ever accessible via a metallurgical route. The new intermetallic compounds, the tetragonal MgPt and Mg$_2$Pt could not be produced via the metallurgical route.

EXAMPLES

Figure 1:
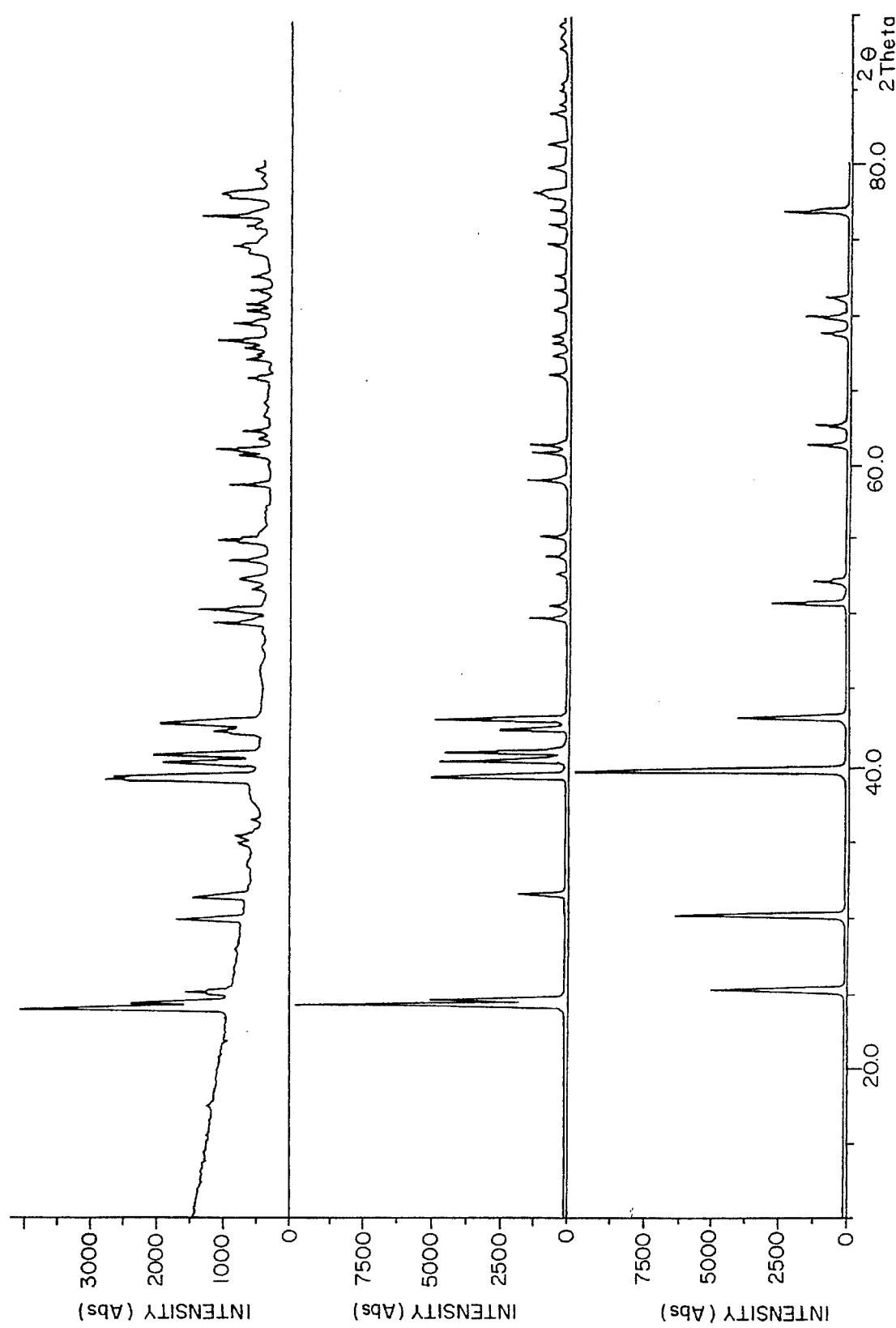
FIG. 1 shows a powder diagram of Mg$_2$Pt measured with a sample of Example 17. Also shown for comparison are the calculated diagrams for Mg$_2$Pt and MgPt. It is evident that the examined sample contains both compounds.

The experiments were carried out in an argon atmosphere; THF was distilled over diethylmagnesium or magnesium anthracene·3 THF (MgA).

The data of Examples 1 to 6 are shown in Table 1.

EXAMPLE 1

To a stirred solution/suspension of 6.94 g (16.6 mmoles) of MgA in 50 ml of THF there was dropwise added at room temperature (RT) within 1 hour a solution of 1.56 g (8.2 mmoles) of anhydrous SnCl$_2$ dissolved in 50 ml of THF, whereupon a black suspension formed. After stirring at RT for 1 hour, a 2 ml sample of the suspension was protolyzed with 2 ml of a mixture of toluene:CH$_3$OH, 25:1, (using n-C$_{16}$H$_{34}$ as internal standard) and analyzed by gas chromatography (GC), whereafter the batch contained 15.4 mmoles of anthracene and 0.3 mmoles of 9,10-dihydroanthracene. In the deep-blue THF solution, 9.4 mmoles of Mg$^{2+}$ and 0.01 mmole of Sn were analyzed by complexometric analysis.

The suspension was filtered, and the solid was washed with THF until the washing liquid was colorless. After drying under vacuum (0.2 mbar), there were obtained 1.17 g of a black pyrophoric solid which had the composition Mg 12.4, Sn 60.5, C 1.9, H 0.3% (Mg:Sn=1:1). After hydrolysis (H$_2$O+5N H$_2$SO$_4$) of a sample of the solid and GC analysis of the organic portion, the solid contained 0.03% of anthracene. According to the X-ray powder analysis the solid was a mixture of the intermetallic Mg compound Mg$_2$Sn with elemental Sn.

The preparation of the mixture of Mg$_2$Sn*+Sn* was repeated in the same manner and with the same amounts as described above and was confirmed by X-ray powder analysis of an isolated small sample of the solid. The still moist solid left after filtration was suspended in 50 ml of THF, the stirred suspension was admixed with a solution of 8.2 mmoles of SnCl$_2$ in 47 ml of THF, and the mixture was stirred at RT for 7 hours. The suspension was filtered, the solid was washed with THF and dried under vacuum (0.2 mbar). According to the X-ray powder analysis, only Sn, but no Mg$_2$Sn, is present in the solid.

EXAMPLE 1a (COMPARATIVE EXAMPLE TO EXAMPLE 1)

To a cooled and stirred solution or suspension of 6.45 g (15.4 mmoles) of MgA in 50 ml of THF there was added all at once a solution of 3.20 g (16.9 mmoles) of anhydrous SnCl$_2$ in 50 ml of THF; thereupon the temperature of the reaction mixture rose from 13° C. to 25° C., and a black solid precipitated. During the subsequent stirring of the batch at RT, samples (of 2 ml) of the solution were taken, and by complexometric titration it was determined that the deposition of tin was completed already after about 3 minutes. After this time, upon the hydrolysis of the sample, a molar ratio of anthracene: 9,10-dihydroanthracene of 30:1 was determined. The suspension was filtered, the precipitate was washed twice with 30 ml of THF each and dried under vacuum (0.2 mbar). 1.34 g of a black powder were obtained which had the composition of Sn 96.8, Mg 1.2, Cl 0.4% and a specific surface area of 16.2 m$^2$/g.

EXAMPLE 2

The experiment was carried out and worked up in the same manner as in Example 1 while, however, the $SnCl_2$ solution was added all at once to the MgA suspension. After a period of reaction of 18 hours at RT, 29.0 mmoles of $Mg^{2+}$ and only traces of $Sn^{2+}$ were detected in the solution.

EXAMPLE 3

A. Preparation of $Mg_2Sn$ from $SnCl_2$ and MgA:

To a stirred solution or suspension of 14.8 g (35.3 mmoles) of MgA in 100 ml of THF there was added at −60° C. a solution of 1.69 g (8.9 mmoles) of $SnCl_2$ in 50 ml of THF. The resulting black suspension was allowed to warm up from −60° C. to −30° C. within 12 hours, from −30° C. to RT within 12 hours, and was stirred at RT for further 12 hours. The suspension was filtered, and the solid was washed seven times with a total of 330 ml of THF, until the initially blue washing liquid running off was colorless. After drying under vacuum (0.2 mbar) there were obtained 1.65 g of a black pyrophoric powder having the composition of Mg 25.59, Sn 64.14, C 5.44, Cl 1.27, H 0.97%. According to the X-ray powder analysis the powder was amorphous; it had a specific surface area of 109.4 m$^2$/g. This $Mg_2Sn$ failed to give any reflections in the X-ray powder diagram even when tempered at 250° C. for 4 hours.

B. Preparation of $Mg_2Sn$ from $SnCl_2$ and MgA, followed by the reaction with $CuCl_2$ to form a Cu-Sn alloy:

To a stirred solution or suspension of 19.0 g (45.4 mmoles) of MgA in 150 ml of THF there was added at −78° C. a solution of 13.1 mmoles of $SnCl_2$ in 70 ml of THF; the resulting black suspension was allowed to warm up to RT within 6 hours, and was then stirred at RT for 4 days (cf. the preparation of $Mg_2Sn^*$ described in A.). Once the $Mg_2Sn^*$ had settled, the yellow supernatant solution was siphoned off, 50 ml of THF were added to the $Mg_2Sn^*$, the resulting suspension was stirred for 30 minutes, and the solution again was siphoned off. This operation was repeated two more times. Then $Mg_2Sn^*$ was suspended in 100 ml of fresh THF, the suspension was admixed with 3.48 g (25.4 mmoles) of anhydrous $CuCl_2$ and was stirred at RT for 82 hours. The black suspension was filtered, the solid was washed 4 or 5 times with THF and was dried under high vacuum. Obtained were 3.18 g of a Mg-containing Cu-Sn alloy which had the composition set forth in Table 5. In the filtrate of the batch, there were found 20.6 mmoles of $Mg^{2+}$ by way of an analysis. In addition to weak reflections caused by Sn, the alloy showed numerous reflections in the X-ray powder diagram which could not yet be assigned.

EXAMPLE 4

$SnCl_2$ was added as a solid material to the suspension of MgA in 170 ml of toluene. After 4 hours of stirring, 28 mmoles of anthracene and 0.4 mmoles of 9,10-dihydroanthracene were found to be present in the solution. Prior to the filtration, the mixture was stirred another 18 hours at RT and 2 hours at 50° C.

EXAMPLE 7

A stirred suspension of 16.70 g (40.0 mmoles) of MgA in 100 ml of THF was admixed at −70° C. with a solution of 43.3 moles of $SnCl_2$ in 176 ml of THF; the mixture, while stirred, was allowed to warm up to RT within 6 hours, and was then stirred for 66 hours at room temperature. A sample of the solid (0.94 g) was isolated and identified as elemental Sn by X-ray powder analysis and elemental analysis (Sn 97.85, Mg 0.57, C 0.44, H 0.11, Cl 0.74%). The clear supernatant solution was siphoned off from the remaining batch, 200 ml of THF were added to the $Sn^*$, the suspension was stirred for 10 minutes, and the solution was again siphoned off. This operation was repeated two more times. Sn was then suspended in 200 ml of fresh THF, 21.5 g (51.7 mmoles) of solid MgA were added to the suspension, and the mixture was stirred at RT for 1 h. The black suspension was filtered, the solid was washed with THF and dried under vacuum (0.2 mbar). Obtained were 4.29 g of $Mg_2Sn^*$ (in admixture with little $Sn^*$), which was identified by means of an X-ray powder analysis; elemental analysis: Sn 72.49, Mg 20.78, Cl 0.59, C 2.82, H 0.43%.

EXAMPLE 8

A solution cooled at 0° C. of 16.2 mmoles of $SnCl_2$ in 87 ml THF was added to 5.72 g (14.8 mmoles) of MgA, and the black suspension was stirred at RT for 21 hours (cf. Example 1a). The supernatant solution was siphoned off; 60 ml of THF were added to the $Sn^*$, the resulting suspension was stirred for 30 minutes, and the solution was again siphoned off. A small portion of $Sn^*$ (about 50 mg) were dried under vacuum and analyzed: Sn 92.86, Mg 0.22, C 0.74, H 0.16%; in the X-ray powder diagram, the $Sn^*$ sample is identical with an authentic sample of Sn powder. The remainder of $Sn^*$ was suspended in 10 ml of THF and added to a mixture comprising 0.62 g (25.7 mmoles) of Mg powder (270 mesh), 0.25 g (1.4 mmoles) of anthracene, and 16 ml of a 0.53 molar $MgCl_2$ solution in THF (8.5 mmoles of $MgCl_2$), which mixture in advance had been stirred at RT for 3 hours to form the deep-blue complex $[Mg_2Cl_3·6 THF]^{\oplus}$-anthracene. After 17 hours of stirring, the suspension was gray-violet, and the solution was deep-blue in color. The suspension was filtered, $Mg_2Sn^*$ was washed 3 or 4 times with THF and was dried under vacuum (0.2 mbar). Obtained were 1.75 g of $Mg_2Sn^*$ as a black powder of the composition Sn 71.91, Mg 25.82, Cl 0.39, C 1.26, H 0.23%. The X-ray powder diagram of the $Mg_2Sn^*$ thus prepared conforms to that of the JCPDS data file (except for two low-intensity reflections). In the dark-blue tin-free filtrate there Were found 1.04 mmoles of anthracene and 0.14 mmoles of 9,10-dihydroanthracene by GC analysis.

The data relating to the Examples 9 to 16 are shown in the Tables 2, 2a and 5.

EXAMPLE 9

A suspension of 1.11 g of $MgH_2$ (76.5% according to thermovolumetric analysis; 32.2 mmoles of $MgH_2$), prepared by catalytic hydrogenation of magnesium [Cr catalyst, RT; Angew. Chem. 92 (1980) 845] in 60 ml of THF was stirred at RT and portionwise admixed with 2.89 g (16.3 mmoles) of anhydrous $PdCl_2$, and the resulting suspension was stirred at RT for 24 hours, whereupon 0.67 $H_2$/Pd were released. Upon heating the suspension at 60° C. for 6 hours until the $H_2$ evolution ceased, the amount of hydrogen evolved increased to 0.92 $H_2$/Pd. The suspension was filtered while still warm, and the solid was subsequently washed with THF. After drying in vacuum (0.2 mbar), 2.10 g of an X-ray amorphous solid were obtained which had the composition of Pd 73.74, Mg 19.07, C 3.19, H 1.86, Cl 2.21% ($Mg_{1.13}PdC_{0.38}H_{2.66}Cl_{0.09}$). In the filtrate of the batch there were titrimetrically determined 17.0 mmoles of $Mg^{2+}$ and 29.5 mmoles of $Cl^-$.

A sample of 1.59 g of the solid was heated from RT to 400° C. at a rate of 1° C./min; in the course thereof, in the temperature range around 317° C., corresponding to the decomposition temperature of $MgH_2$, 224 ml of a gas (20° C./1 bar) were obtained which had the composition of $H_2$ 95.1, $CH_4$ 1.2, $C_4H_{10}$ 3.7%. After hydrogenation under pressure (20 bar/200° C./24 hours), the sample was once more subjected to thermolysis as described above, whereupon only 26 ml of gas were formed. After this operation, the sample failed to absorb any $H_2$ in a hydrogen atmosphere at 102° C. under normal pressure, according to which finding the presence of finely divided metallic palladium is to be excluded. Due to the broad reflections at d=2.230 (100), 3.161 (38.9), 1.822 (25.7), and 1.289 (25.0) in the X-ray powder diagram, the sample contains the cubic MgPd known from the literature (P. I. Kripyakevich, E. I. Gladyshevskii, Kristallografiya 5 (1960) 552; CA 13641, 1962), however not any free Mg or Pd. [After annealing a small portion of the sample (690° C./72 hours/argon), the cubic MgPd was converted into the tetragonal $Mg_{0.9}Pd_{1.1}$ (X-ray powder reflections at d= 2.2550 (100), 2.1395 (34.2), 3.0264 (25.6), and 1.2555 (23.9)]. Upon a renewed pressure hydrogenation, the sample failed to yield virtually any gas as described above and exhibited the reflections of the tetragonal $Mg_{0.9}Pd_{1.1}$ in the X-ray powder diagram, but no reflections of free Mg or Pd. Composition of the sample after the operations described: Pd 78.65, Mg 17.61, C 1.18, H 0.78, Cl 1.58% ($MgPd1.02C_{0.14}H_{1.07}Cl_{0.06}$).

EXAMPLE 11

38 ml of a 1.31-molar $MgH_2'$-solution in THF (49.9 mmoles of $MgH_2'$), prepared according to the DE-OS 37 22 993 (catalyst: 1% by mole of $FeCl_2$-Mg-anthracene, 4% by mole of quinuclidine, 9% by mole of $MgCl_2$) were stirred and at −78° C. portionwise admixed with 2.57 g (14.5 mmoles) of anhydrous $PdCl_2$. Then the batch with continuous stirring was allowed to warm up from −78° C. to RT within 3 hours, whereupon the evolution of $H_2$ began to occur at about −55° C. The batch was stirred for further 42 hours at room temperature until the $H_2$ evolution ceased. Work-up and analysis were carried out as described in Example 9. Data on the experiment are shown in the Tables 2 and 2a. The resulting solid is the amorphous Mg-Pd carbide which is preparable also from $MgH_2'$ and bis($\eta^3$-allyl)palladium {Zeitschr. Phys. Chem. N.F. 162 (1989) 191}.

EXAMPLE 11a

COMPARATIVE EXAMPLE TO EXAMPLE

If $MgH_2'$ is reacted with $PdCl_2$ in a molar ratio of 1:1 in THF at room temperature, then after work-up there is obtained a finely divided, highly reactive Pd powder (Table 2), however not any Mg-Pd compound.

EXAMPLE 12

59 ml of a 0.84-molar $MgH_2'$-solution in THF (49.6 mmoles), prepared according to the DE-OS 37 22 993 were vigorously stirred and in a closed system at RT were portionwise admixed with 2.11 g (11.9 mmoles) of anhydrous $PdCl_2$, so that the internal temperature did not exceed 30° C. The $H_2$ evolution began immediately. After 1 hour of stirring at RT and development of altogether 1.13 $H_2$/Pd (Gl. 17) the suspension was filtered. Work-up and analysis were carried out as described in Example 9. Data on the experiment are shown in the Tables 2 and 2a. The resulting solid is the reversible hydride $Mg_2PdH_x$ (literature quoted in Example 11), as is concluded from the behavior in dehydrogenation/re-hydrogenation cycles and from the composition.

EXAMPLE 13

To a stirred suspension of 2.48 g (14.0 mmoles) of the anhydrous $PdCl_2$, dried under high vacuum, in 60 ml of THF at −78° C. there was added a solution cooled at −78° C. of 2.34 g (28.5 mmoles) of $MgEt_2$ in 50 ml of THF (the color turns to black!), and the suspension was subsequently stirred at the constant temperature for 48 hours. Then the vessel was connected to a gas burette, was then allowed with permanent stirring to warm up from −78° C. to RT within 2 hours and was then stirred at room temperature for another 48 hours. Then the volatile components were condensed under vacuum (0.2 mbar) in two cold traps connected in series (−78° C. and −196° C.). MS analysis of the quantities of the gases evolved during the warm-up period and at RT and present in the condensates yielded 2.02 $C_2H_6$/Pd and 1.77 $C_2H_4$/Pd. The residue was taken up with 100 ml of fresh THF, the suspension was stirred at RT for a short time, filtered, the precipitate was washed several times with THF and twice with pentane, and was dried under high vacuum. 0.25 g of a black powder are obtained, which has the composition as reported in Table 2. In the THF solution having a deep-brown color there were found by complexometric titration after hydrolytic workup 28.8 mmoles of $Mg^{2+}$ 28.6 mmoles of $Cl^-$ and by atomic absorption analysis 12.3 mmoles of $Pd^{2+}$.

To an aliquot of the $Pd(MgCl)_2$ solution prepared as described above (1.32 mmoles of Pd in 56 ml of THF) there were added 0.29 g (1.65 mmoles) of $PdCl_2$, the suspension was stirred at RT for several days, centrifuged, and the resulting solid was washed with THF and dried under high vacuum. Obtained were 0.16 g of a solid, the composition of which has been set forth in Table 5.

Another part of the $Pd(MgCl)_2$ solution (4.51 mmoles of Pd in 80 ml of THF) was admixed with the equimolar amount of $SnCl_2$ in THF (0.85 g, 4.50 mmoles of $SnCl_2$ in 10 ml of THF); the suspension was stirred at RT for 3 to 4 days, filtered, and the black, extremely fine precipitate was washed with THF. Upon drying under high vacuum there were obtained 1.02 g of an X-ray amorphous powder having the composition as indicated in Table 5. In the THF-filtrate of slightly brown color there were found by complexometric titration 8.8 mmoles of $Mg^{2+}$ and 17.6 mmoles of $Cl^-$ and by atomic absorption analysis 0.026 mmoles of Pd and 0.034 mmoles of Sn.

The data of the Examples 16 to 20 are shown in the Tables 3, 3a and 5, the data of the Examples 21 to 27 are shown in the Tables 4 and 5a, and the data of the Examples 28 to 32 are shown in the Tables 4a and 5a.

EXAMPLE 28

A suspension of 4.86 g (0.20 moles) of Mg powder (270 mesh) in 130 ml of tetrahydrofurane was subjected to an ultrasonic treatment for 1¾ hours; thereto, 2.53 g (19.9 mmoles) of $FeCl_2$ (anhydrous) were added, and the resulting mixture was again subjected to the ultrasonic treatment for 1 hour and then stirred at RT for 18 hours. An aliquot part of the suspension was centrifuged with 10,000 rpm for 1 hour to remove Mg and Fe* from the solution. The determination of the amount of hydrogen evolved upon protolysis of an aliquot of the clear deep-blue solution and of the iron dissolved therein (13.5% of the initial $FeCl_2$ amount) resulted in 1.52 $H_2$/Fe.

EXAMPLE 32

A suspension of 20.0 g (0.82 moles) of Mg powder (270 mesh), 1.78 g (10 mmoles) of anthracene and 0.2 ml (2.6 mmoles) of ethyl bromide in 100 ml THF were stirred for 2 to 3 hours until the formation of MgA was completed. To the stirred product, 1.97 g (10.2 mmoles) of $NiCl_2 \cdot 0.9$ THF were added within two hours, the resulting mixture was stirred for 3 hours, filtered, and the filter cake was washed with THF. An aliquot of the clear black filtrate (113 ml) was hydrolyzed with 2N $H_2SO_4$, and the hydrogen formed thereupon (2.2 $H_2$/Ni) was analyzed by mass spectrometry. A further sample of the filtrate was protolyzed with $CH_3OH$ which had been admixed with n-octane and n-hexadecane as internal standards; the sample was centrifuged (to remove the precipitated nickel), and the solution was analyzed by gas chromatography. The solution (113 ml) contained, according to the GC analysis, 1.0 mmole of n-butanol, 7.5 mmoles of 9,10-dihydroanthracene, 0.1 mmoles of anthracene, 0.2 mmoles of tetrahydroanthracene and 0.1 mmoles of 9-(4-hydroxybutyl)-9,10-dihydroanthracene and, according to the complexometric titration 6.6 mmoles of $Ni^{2+}$, 27.2 mmoles of $Mg^{2+}$ and 17.0 mmoles of $Cl^-$.

EXAMPLE 33

13.0 g (31 mmoles) of MgA is suspended in 50 ml THF. 50 ml of a 0.45 molar solution of $GaGl_3$ in THF is dropped over a period of 0.5 h into the stirred MgA/THF suspension previously cooled to −78° C. The color of the suspension changes from orange to a dark brown-black. The suspension is allowed with stirring to warm up to room temperature over a period of ~18 h to give a black suspension. The product, active Ga metal (Ga*), is allowed to settle on the bottom of the flask and the green or yellow colored supernatant is removed. The solid is washed with several additions of fresh TI-IF until the supernatant is colorless. The metal can also be isolated by centrifuging the reaction slurry and, after washing, transferring the solid suspended in fresh THF to a Schlenk flask.

3.6 g (8.6 mmoles) of MgA are transferred at room temperature to the Ga*THF suspension via 4-shaped bridge. The reaction suspension immediately turns green. After stirring at room temperature for 24 h, the product is allowed to settle out of the suspension (now dark grey or black colored), washed with several additions of fresh THF, and dried under high vacuum. Yield: 90% of $Mg_2Ga_5$, obtained as a crystalline, black pyrophoric powder. Only the diffraction lines corresponding to $Mg_2Ga_5$ (Acta Cryst. B 25, (1969) 554) are noted in the X-ray diffraction pattern.

EXAMPLE 34

9.21 g (22.3 mmoles) of MgA were suspended in 400 ml toluene and stirred at room temperature for 24 h yielding in a fine suspension of active magnesium (Mg*). A large proportion of the solvent toluene was removed by decantetlon, leaving ca. 40 ml of toluene with Mg* metal. After adding 100 ml of freshly distilled THF and 2.25 g (7.2 mmoles) of anhydrous $BiCl_3$ to Mg*/THF suspension, the reaction suspension was stirred for 48 h at room temperature. After filtration, washing with TI42= and pentane, and drying under vacuum, 1.80 g (97%) of $Bi_2Mg_3$ were obtained as a black pyrophoric powder having a specific surface area of 68 $m^2$/g and containing ~4 wt % of organic matter and 1.5 wt % Cl. The X-my powder diagram of $Bi_2Mg_3$ thus prepared exhibits, apart from two weak signals for Bi, only strong reflections for $Bi_2Mg_3$.

EXAMPLES 35–37

Anhydrous metal chlorides ($AuCl_3$, $HgCl_2$ and $PbCl_2$; Table 6) were added in the course of 5 rain to the stirred suspensions of MgA in THF and the reaction suspensions stirred for the time given in the table 6. After filtration, washing with THF (until the final wash was colorless) and drying, under vacuum, the magnesium intermetallics (table 6) were obtained as black or grey powders and identified by X-ray powder diffractometry.

EXAMPLE 38

$NbCl_5$ reacts with catalytically prepared magnesium hydride (U.S. Pat. No. 4,554,153) in the molar ratio 1:5 in THF at room temperature with the evolution of 1.5 $H_2$/Nb and formation of a THF-soluble complex of the composition $Cl_2Nb(HMgCl)_3$. After removing THF via vacuum distillation, the solid complex liberates upon thermolysis between 135°–285° C. at ambient pressure gas with the composition $H_2$ 69% (0.8 $H_2$/Nb), 12% $CH_4$, 5% $C_2$–, 6% $C_3$– and 8% $C_4$-hydrocarbons.

EXAMPLE 39

$RhCl_3$ reacts with $MgEt_2$ in the molar ratio 1:2 in THF at room temperature with evolution of 2.3 mole $C_2H_6$– and 1.5 mole $C_2H_4$/Rh and formation of a THF-soluble complex of the composition $RhMg_2Cl_3$. The latter reacts with $SnCl_2$ in the molar ration 2:1 in boiling THF with formation of a precipitate of a Rh-Sn-alloy $Rh_2Sn$.

EXAMPLE 40

In the course of the reaction of $IrCl_3$ with $MgEt_2$ in the molar ratio of 1:3 in THF at room temperature, 2.3 moles $C_2H_6$, 1.2 mole $C_2H_4$ and 0.3 mole $C_2H_2$/Ir are set free, while 1 mole of $MgEt_2$ remains unchanged. The clear THF solution contains an Ir-complex of the composition $IrMg_2Cl_3$ analogous to the complex $RhMg_2Cl_3$ of the example 39.

EXAMPLE 41

To a suspension of 1.06 g (34.1 mmoles) of catalytically prepared magnesium hydride ($MgH_2^*$, U.S. Pat. No. 4,554,153) in 30 ml THF were added 1.58 g (7.5 mmoles) of anhydrous $RhCl_3$ and the suspension stirred for 22 h at room temperature resulting in the evolution of 1.2 mole $H_2$/Rh. The precipitate was filtered off, washed with THF and dried in high vacuum affording 1.53 g of a solid 1.14 g of the solid delivered on programmed heating (1° C./min) to 400° C. at ambient pressure 291 ml gas composed of $CH_4$ and $H_2$ (62.9 %). The resulting solid was subjected to two hydrogenation/dehydrogenation cycles (1. cycle: hydrogenation at 30–40 bar $H_2/230°-380°$ C./71 h; dehydrogenation at ambient pressure r.t. – 400° C., 1° C./min, 118 ml $H_2$. 2. cycle: hydrogenation at 25 bar $H_2/200°$ C./24 h; dehydrogenation as in the first cycle, 98 ml of a 10:1 $H_2$-$CH_4$ mixture) and thereafter annealed under argon at 550° C. for 20 h. The X-ray powder diffraction lines of the annealed sample can be assigned to a hitherto unknown intermetallic $Mg_2Rh$ having a tetragonal (a=3.1914, b=10.1054 Å) $MoSi_2$ structure type.

TABLE 1

Preparation of the intermetallic compound $Mg_2Sn$ or of the finely divided tin from $SnCl_2$ and magnesium anthracene · 3 THF (MgA), Mg in the presence of anthracene or Mg

| Example No. | $SnCl_2$ g (mmoles) | Mg-Component g (mmoles) | Sn:Mg Atomic Ratio | Solvent [ml] | React. Temp. [°C.]/ React. Time [h][a] | Solid Material [g] | Composition [%] Mg Sn C H Cl Emperical Formula | Surface area[b] [m²/g] | X-ray Powder Analysis | Procedure and Work-up |
|---|---|---|---|---|---|---|---|---|---|---|
| 1 | 1.56 (8.2) | MgA 6.94 (16.6) | 1:2 | THF 100 | RT/1 | 1.17 | 12.4 60.5 1.9 0.3 MgSn | | $Mg_2Sn$ + Sn cf. | cf. Text Example 1 |
| 1a | 3.20 (16.9) | MgA 6.45 (15.4) | 1:1 | THF 100 | RT/1 | 1.34 | 1.2 96.8 0.4 | 16.2 | | cf. Text |
| 2 | 5.14 (27.1) | MgA 34.8 (83.1) | 1:3 | THF 445[c] | RT/18 | 4.98 | 23.3 69.8 4.4 1.6 0.1 $Mg_{1.63}Sn$ | 36.4 | Example 8 $Mg_2Sn$ + | Example 1a Same as |
| 3 | 1.69 (8.9) | MgA 14.8 (35.3) | 1:4 | THF 150[c] | -60-30/16 -30 RT/ 12 RT/12 | 1.65 | 25.6 64.1 5.4 1.0 1.3 $Mg_{1.94}Sn$ | 109.4 | little Sn amorphous[d] | Example 1 Same as Example 2, but at −60° C. |
| 4 | 1.76 (9.3) | MgA 11.5 (27.5) | 1:3 | Tol. 170 | RT/22 | 1.61[e] | 22.7 66.0 4.9 0.8 3.0 $Mg_{1.70}Sn$ | 76 | $Mg_2Sn$ + | cf. Text |
| 5 | 1.23 (6.5) | Mg[f] 0.45 (18.5) | 1:3 | THF 100[c] | RT/18 | 0.97[g] | 25.9 72.7 0.4 0.2 0.4 $Mg_{1.74}Sn$ | 14.8 | traces of Sn $Mg_2Sn$ + | Example 4 Same as |
| 6 | 1.10 (5.8) | Mg[h] 0.44 (18.1) | 1:3.1 | THF 65 | RT/6 | 0.83[i] | 26.4 71.9 0.6 0.2 0.5 $Mg_{1.79}Sn$ | 10.2 | little Sn $Mg_2Sn$ + little Sn | Example 1 Same as Example 1 |

[a] After completion of the addition of $SnCl_2$.
[b] BET method.
[c] $SnCl$ dissolved in ⅓ of the total amount of THF.
[d] Also after 4 hours of annealing at 250° C.
[e] The solid was washed 2 times with toluene and 3 times with THF.
[f] Mg power (270 mesh + 3.3% by mole of MgA.
[g] In solution 7.3 mmoles of $Mg^{2+}$ and 0.0 mmoles of Sn.
[h] Mg powder (270 mesh).
[i] In solution 3.9 mmoles of $Mg^{2+}$ and 0.0 mmoles of Sn.

TABLE 2

Preparation of intermetallic Mg-Pd compounds or of the hydrides thereof from $PdCl_2$ and catalytically prepared undissolved ($MgH_2$*) or dissolved magnesium hydride ($MgH_2'$) or organomagnesium compounds

| Example No. | $PdCl_2$ g (mmoles) | Mg-Component (mmoles) | Pd:Mg Ratio | THF [ml] | React. Temp. [°C.]/ React. Time [h][a] | Evolved Gas moles/ g-atom of Pd | Solid Material [g] | Composition [%] Mg Pd C H Cl Empirical Formula | X-ray Powder Analysis | Pd:Mg:Cl:H[b] in soln./mole of $PdCl_2$ used | Procedure and Work-up |
|---|---|---|---|---|---|---|---|---|---|---|---|
| 9 | 2.89 (16.3) | $MgH_2$* (32.2) | 1:2 | 60 | RT/24 60/6 | 0.92 $H_2$ | 2.10[c] | 19.1 73.7 3.2 1.9 2.2 $Mg_{1.13}PdC_{0.38}H_{2.66}Cl_{0.1}$ | am. | 1.04:1.81 | cf. Text Example 9[c] |
| 10 | 3.29 (18.5) | $MgH_2$* (56.2) | 1:3 | 60 | RT/2 b.p./ 4.5 | 1.1 $H_2$ | 2.80[c] | 29.9 65.3 2.0 2.2 0.7 $Mg_2PdC_{0.27}H_{3.49}Cl_{0.03}$ | am. | 1.17:2.00 | Same as Example 9[c] |
| 11 | 2.57 (14.5) | $MgH_2$* (49.9) | 1:3.4 | 38 | -78 RT/3 RT/42 | 1.6 $H_2$ | 1.94[c] | 17.4 77.3 3.7 1.2 0.5 $MgPdC_{0.43}H_{1.6}Cl_{0.02}$ | am. | 2.39:2.2:1.2 | cf. Text Example 11[c] |
| 11a[d] | 2.74 (15.4) | $MgH_2$* (15.7) | 1:1 | 31 | RT/3 | 0.64 $H_2$ | 1.59[c] | 0.4 95.6 1.8 1.2 0.7 | Pd | 1.19:2.1 | Same as Example 11 |

TABLE 2-continued

Preparation of intermetallic Mg-Pd compounds or of the hydrides thereof from $PdCl_2$ and catalytically prepared undissolved ($MgH_2$*) or dissolved magnesium hydride ($MgH_2$') or organomagnesium compounds

| Example No. | $PdCl_2$ g (mmoles) | Mg-Component (mmoles) | Pd:Mg Ratio | THF [ml] | React. Temp. [°C.]/ React. Time [h][a] | Evolved Gas moles/ g-atom of Pd | Solid Material [g] | Composition [%] Mg Pd C H Cl Empirical Formula | X-ray Powder Analysis | Pd:Mg:Cl:H[b] in soln./mole of $PdCl_2$ used | Procedure and Work-up |
|---|---|---|---|---|---|---|---|---|---|---|---|
| 12 | 2.11 (11.9) | $MgH_2$* (49.6) | 1:4 | 59 | RT/1 | 1.13 $H_2$ | 1.75[c] | 29.1 63.8 3.9 2.7 0.3 $Mg_2PdC_{0.54}H_{4.45}Cl_{0.01}$ | am. | 0.08:2.31:2.4:1.28 | cf. Text Example 12[c] |
| 13 | 2.48 (14.0) | $MgEt_2$ (28.5) | 1:2 | 110 | −73/48 −73 RT/2 RT/48 | 2.02 $C_2H_6$ 1.77 $C_2H_4$ | 0.25 | 12.1 61.4 6.7 1.1 4.2 $MgPd_{1.16}C_{1.12}H_{2.17}Cl_{0.2}$ | | 0.88:2.06:2.05 | cf. Text Example 13[f] |
| 13a[d] | 1.15 (6.5) | $MgEt_2$ (6.5) | 1:1 | 50 | −78/2.5 −78 RT/2 RT/12 | 1.5 $C_2H_6$ 0.6 $C_2H_4$ | 0.68 | 0.5 92.9 3.2 0.3 2.7 | g) | 0.93:1:7 | Same as Example 13 |
| 14 | 2.12 (12.0) | EtMgBr (47.8) | 1:4 | 141 | −78/12 −78 RT/20 RT/16 | 1.9 $C_2H_6$ 1.7 $C_2H_4$ | 0.21 | 10.3 80.4 4.9 1.1 3.2 $MgPd_{1.8}C_{1.0}$ | | 3.9:6.2[h] | Same as Example 13 |
| 15 | 1.77 (10.0) | EtMgBr (99.5) | 1:10 | 200 | −78/11 −78 RT/16 RT/17 | 1.9 $C_2H_6$ 1.6 $C_2H_4$ | 0.0 | | | 9.9:11.8[h] | Same as Example 13 |

[a]After completion of the addition of $PdCl_2$. -
[b]Due to the hydrogen developed upon protolysis. -
[c]Thermal treatment and/or dehydrogenation cf. Table 2a. -
[d]Comparative experiments. -
[e]The solid reversibly reacts with 0.6–0.7 $H_2$/Pd (Absorption: RT to +80° C.; Desorption: 150° C./normal pressure.-
[f]Reaction with $PdCl_2$ and $SnCl_2$ cf. Table 5. -
[g]Diffuse reflections; after annealing (600° C., 72 hours): Pd. -
[h]Sum of Cl + Br. -
[i]However, solid $PdCl_2$ was added to the EtMgBr solution.

TABLE 2a

Dehydrogenation/Re-hydrogenation of the ternary Mg—Pd hydrides and thermal treatment of the intermetallic Mg—Pd compounds from the Examples 9 to 12 and results of the X-ray powder analysis

| Example No. | 1st Dehydrogen. or thermal treatm.[a] | | | | | 2nd Dehyd./therm. treatm.[a] | | | |
|---|---|---|---|---|---|---|---|---|---|
| | ml of gas[b]/ g sample | Temp. range [°C.] | Gas Composition[c] $H_2$ | $CH_4$ | $C_4H_{10}$ | Re-hydrogenation bar/°C./h | ml of gas[b]/ g sample | Temp. range [°C.] | $H_2$ |
| 9 | 141 | 317 | 95.1 | 1.2 | 3.7 | 20/200/24 | 16 | | |
| 10 | 241 | 323 | 96.9 | — | 3.1 | 20/200/24 | 48 | 240–380 | 100[c] |
| 11 | 46 | 100–280 | 93.2 | — | 3.2 | 15/200/24 | 0[h] | | |
| 12 | 179 | 252 | 94.2 | — | 5.8 | 15/200/24 | 65 | 245 | 100 |

| Example No. | X-ray Powder Analysis | 2nd Re-hydrogenation bar/°C./h | 3rd Dehydra[a] ml of $H_2$[h] g sample | Temp. range [°C.] | X-ray Powder Analysis | Empirical Formula after the 3rd Dehydr./ Thermal Treatment |
|---|---|---|---|---|---|---|
| 9 | $MgPd$[d] | 95/160/24 | max. 8 | | $Mg_{0.9}Pd_{1.1}$ | $MgPdC_{0.14}H_{1.07}Cl_{0.06}$ |
| 10 | diffuse[f] | 20/200/89 | 56 | 255[g] | diffuse | |
| 11 | amorphous | | | | | |
| 12 | | 20/190/24 | 50 | 243[g] | diffuse | $Mg_2PdC_{0.07}H_{0.54}Cl_{0.07}$ |

[a]A sample of 1–2 g of the solid is heated in the thermo-volumetric apparatus (Chem.-Ing.-Techn. 55 [1983] 156) at a heating rate of 1° C./min from room temperature up to 400° C.
[b]ml of gas (20° C./1 bar) per gram of weighed sample.

TABLE 2a-continued

Dehydrogenation/Re-hydrogenation of the ternary Mg—Pd hydrides and
thermal treatment of the intermetallic Mg—Pd compounds
from the Examples 9 to 12 and results of the X-ray powder analysis

[c] According to the MS analysis.
[d] A small part of the sample was annealed at 690° C. for 72 hours; thereupon, reflections of the tetragonal $Mg_{0.9}Pd_{1.1}$ were observed in the X-ray powder diagram.
[e] Composition after the second dehydrogenation: $Mg_2PdC_{0.07}H_{0.88}Cl_{0.02}$.
[f] A small part of the sample was annealed at 600° C. for 48 hours; thereupon, sharp reflections of the cubic MgPd were observed in the X-ray power diagram.
[g] Corresponding to the decomposition temperature of the $Mg_2PdH_x$ (Zeitschr. Phys. Chem. N.F. 162 (1989) 191).
[h] Composition after the second thermal treatment $MgPdC_{0.03}H_{0.12}Cl_{0.15}$.

TABLE 3

Preparation of intermetallic Mg-Pt compounds or of the hydrides thereof from $PtCl_2$ and catalytically prepared undissolved ($MgH_2$*) or dissolved magnesium hydride ($MgH_2$') or magnesium diethyl

| Example No. | $PtCl_2$ g (mmoles) | Mg-Component (mmoles) | Pt:Mg Ratio | THF [ml] | React. Temp. [°C.]/ React. Time [h][a] | Evolved Gas moles/ g-atom of Pt | Solid Material [g] | Composition [%] Mg Pt C H Cl Empirical Formula | X-ray Powder Analysis | Pt:Mg:Cl:H[b] in soln./mole of $PdCl_2$ used | Procedure and Work-up |
|---|---|---|---|---|---|---|---|---|---|---|---|
| 16 | 5.63 (21.2) | $MgH_2$* (42.5) | 1:2 | 50 | RT/ 65[c] | 0.97 $H_2$ | 4.74[d] | 10.3 85.7 1.6 1.0 1.1 $MgPt_{1.04}C_{0.32}H_{2.41}Cl_{0.07}$ | e) | 1.07:2.03 | Same as Example 9[d] |
| 17 | 1.93 (7.2) | $MgH_2$* (21.7) | 1:3 | 40 | RT/21 | 1.07 $H_2$ | 1.80[d] | 20.4 71.8 3.7 2.6 1.4 $Mg_{2.28}PtC_{0.84}H_{6.96}Cl_{0.1}$ | e) | 0.0:1.07:1.92 | Same as Example 9[d] |
| 18 | 2.63 (10.1) | $MgH_2$* (30.3) | 1:3 | 30 | -78/11 -78 RT/6 RT/1 | 1.34 $H_2$ | 2.40[d] | 11.1 81.1 3.3 1.3 3.1 $Mg_{1.1}PtC_{0.65}H_{2.98}Cl_{0.2}$ | am. | 1.72:2.30:0.61 | Same as Example 11[d] |
| 19 | 2.85 (10.7) | $MgH_2$* (42.8) | 1:4 | 49 | RT/1 | 1.03 $H_2$ | 2.50[d] | 21.0 71.4 4.4 1.6 1.5 $Mg_{2.36}PtC_{1.01}H_{4.2}Cl_{0.1}$ | am. | 2.16:2.79:0.82 | Same as Example 12[d] |
| 20 | 4.24 (15.9) | $MgEt_2$ (31.8) | 1:2 | 115 | -78/ RT/1 b.p./ 0.5 | 2.0 $C_2H_6$ 1.8 $C_2H_4$ | 0.0 | | | 1.0:2.0:1.9 | Same as Example 13 |

[a] After completion of the addition of $PtCl_2$. -
[b] Due to the hydrogen developed upon protolysis. -
[c] After 1 hour 0.90 $H_2$/Pt. -
[d] Thermal treatment and/or dehydrogenation cf. Table 3a. -
e) Diffuse reflections.

TABLE 3a

Dehydrogenation of the ternary Mg-Pt hydrides and thermal treatment of the intermetallic Mg-Pt compounds from the Examples 16 to 19 and results of the X-ray power analysis

| Example No. | 1st Dehyrogen. or thermal treatm.[a] | | | | | | Hydrogen. Cond. bar/ °C./h | 2nd Dehydr.[a] ml of Gas[b] | Composition [%] Mg Pt C H Cl Empirical Formula | X-ray Powder Analysis | Annealing of the Sample °C./hour | X-ray Powder Analysis after Annealing |
|---|---|---|---|---|---|---|---|---|---|---|---|---|
| | ml of gas[b] /g of sample | Temp. Gas range [°C.] | Composition[c] $H_2$ | $CH_4$ | $C_3H_8$ | $C_4C_{10}$ | | | | | | |
| 16 | 90 | 357 | 86.5 | 5.1 | 2.5 | 1.5 | 40/ 240/24 | 0 | 10.1 88.5 0.3 0.2 0.8 | | 700/24 | $MgPt_3$[d] |
| 17 | 156 | 340 | 89.3 | 4.7 | 2.1 | 3.8 | 40/ 240/24 | 0 | $MgPt_{1.09}C_{0.1}H_{0.4}Cl_{0.05}$ 20.7 76.6 0.5 0.3 1.8 $Mg_{2.17}PtC_{0.1}H_{0.66}Cl_{0.13}$ | Weak reflections | 700/24 | e) |

TABLE 3a-continued

Dehydrogenation of the ternary Mg-Pt hydrides and thermal treatment of the intermetallic Mg-Pt compounds from the Examples 16 to 19 and results of the X-ray power analysis

| Example No. | 1st Dehyrogen. or thermal treatm.[a] ml of gas[b] /g of sample | 1st Dehyrogen. or thermal treatm.[a] Temp. Gas range [°C.] | 1st Dehyrogen. or thermal treatm.[a] Composition[c] $H_2$ | 1st Dehyrogen. or thermal treatm.[a] Composition[c] $CH_4$ | 1st Dehyrogen. or thermal treatm.[a] Composition[c] $C_3H_8$ | 1st Dehyrogen. or thermal treatm.[a] Composition[c] $C_4C_{10}$ | Hydrogen. Cond. bar/ °C./h | 2nd Dehydr.[a] ml of Gas[b] | Composition [%] Mg Pt C H Cl Empirical Formula | X-ray Powder Analysis | Annealing of the Sample °C./hour | X-ray Powder Analysis after Annealing |
|---|---|---|---|---|---|---|---|---|---|---|---|---|
| 18 | 66 | 83–300 | 86.7 | 4.8 | — | 8.5 | 50/ | 0 | 14.4  0.3 0.1 2.9 | amorphous | 600/24 | tetragonal |
| 19 | 117 | 210–375 | 83.4 | 3.6 | — | 12.4 | 200/43 100/ 200/60 | 22[g] | 19.3 78.6 0.4 0.3 1.5 $Mg_2PtC_{0.09}H_{0.41}Cl_{0.11}$ | amorphous | 700/24 | MgPt[f] e) |

Figure 2:
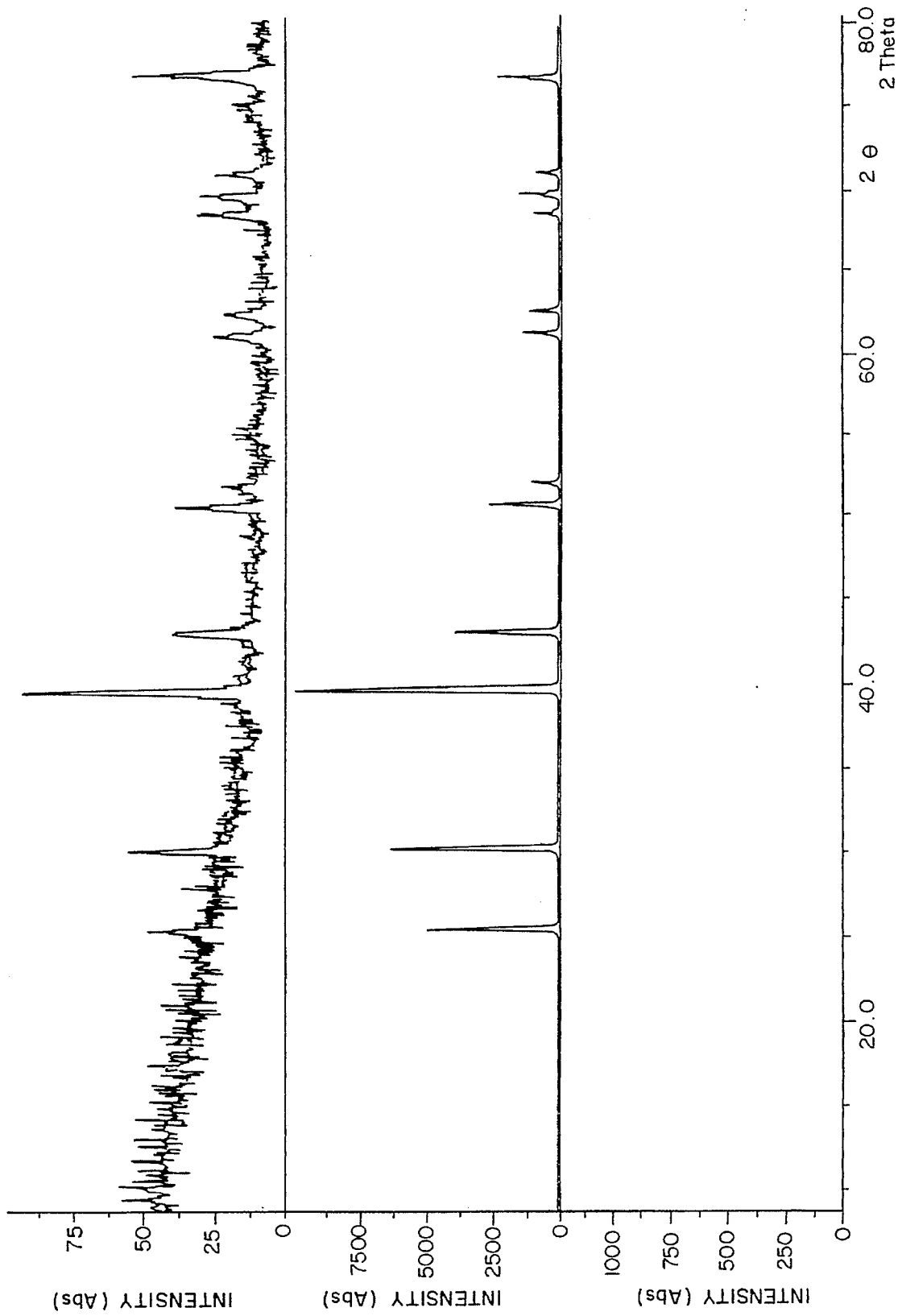
FIG. 2 shows a powder diagram of MgPt measured with a sample of Example 18. Also shown for comparison is the calculated diagram for MgPt. It is evident that the examined sample consists of only one compound.

[a),b),c)]cf. Table 2a. -
[d)]The sample additionally contains still one (?) further Mg-Pt phase. -
e) Monoclinic $Mg_2Pt$ and tetragonal MgPt (cf. FIG. 1). -
[f)]cf. FIG. 2. -
[g)]At about 320° C. (98% of $H_2$) corresponding to $MgH_2$.

TABLE 4

Preparation of THF-soluble $M^1$—Mg hydridehalides or of intermetallic Mg compounds from metal halides ($M^1Cl_m$) and dissolved magnesium hydride ($MgH_2'$)

| Example No. | $M^1Cl_m$ g (mmoles) | $MgH_2'$ [mmoles] | $M^1$:Mg Atomic Ratio | THF [ml] | React. Temp. [°C.]/ React. Time [h][a] |
|---|---|---|---|---|---|
| 21 | $FeCl_2$ 4.20 | (33.1) | 71.8 | 1:2.2 | 50 | −78 RT/5  RT/3 |
| 21a | $FeCl_2$ 1.84 | (14.5) | 14.7 | 1:1 | 29 | −78 RT/5  RT/3 |
| 21b | $FeCl_2$ 3.83 | (30.2) | 45.4 | 1:1.5 | 62 | −78 RT/15  RT/3 |
| 22 | $CoCl_2$ 6.45 | (49.7) | 103 | 1:2 | 53 | −78 RT/5  RT/3 |
| 23 | $NiCl_2$.1.5 THF 4.05 | (17.2) | 35.1 | 1:2 | 29 | −78/26  −78 RT/24  RT/18 |
| 23a | $NiCl_2$.1.5 THF 4.05 | (17.2) | 18.0 | 1:1.06 | 25 | −78 RT/17 |
| 24 | $RuCl_3$ 1.03 | (5.0) | 15.1 | 1:3 | 20 | −78 RT/25  RT/22 |
| 25 | $RhCl_3$ 1.21 | (58) | 18.7 | 1:3.2 | 26 | +25 + 30/2 |
| 26 | $MnCl_2$ 1.72 | (13.7) | 54.6 | 1:4 | 38 | +20 + 30/4 |
| 27 | $CuCl_2$ 6.38 | (46.8) | 97.0 | 1:2.07 | 60 | |

| Example No. | $H_2$-Evolution [moles/g-atom of $M^1$] | Solid Material [g] | $M^1$:Mg:Cl:H[b] in soln./ mole of $M^1Cl_m$ | Procedure and Work-up |
|---|---|---|---|---|
| 21 | 0.92 | 0.0 | 1.0:2.03:2.35:2.26 | Same as Example 11[c] |
| 21a | 0.79 | 0.92[d] | 0.02:1.0:2.0 | Same as Example 11 |
| 21b | 0.89 | 1.20 | 0.45:1.39:2.26:0.59 | Same as Example 11 |
| 22 | 0.99 | 0.57[e] | 1.0:2.18:2.43:1.96 | Same as Example 11[f] |
| 23 | 1.0 | g) | 1.0:2.07:2.13:2.07 | Same as Example 11[h] |
| 23a | 0.80 | 1.02[i] | 0.06:1.05:2.03:0.12 | Same as Example 11 |
| 24 | 0.75 | — | | Same as Example 11 |
| 25 | 1.4 | 0.068 | | Same as Example 11 |
| 26 | 1.1 | 0.037 | | Same as Example 11 |
| 27 | 1.2 | 4.25 | | Same as Example 11 |

[a)]After completion of the addition of $M^1Cl_m$.
[b)]Due to the hydrogen developed upon protolysis.
[c)]Reaction with $FeCl_2$, $CoCl_2$, $NiCl_2$ and $CuCl_2$; cf. Table 5a.
[d)]Fe 86.4, Mg 1.6, C 6.0, Cl 6.2%.
[e)]Substantially $MgH_2$, according to the elemental analysis.
[f)]Reaction with $FeCl_2$, cf. Table 5a.
[g)]Small amount of $MgCl_2$.
[h)]Reaction with $NiCl_2$ and $CoCl_2$, cf. Table 5a.
[i)]Ni 87.7, Mg 2.0, C 6.8, H 1.4, Cl 2.1%.

TABLE 4a

Preparation of THF-soluble complexes $Fe_2Mg_3Cl_4$, and $Ni(MgCl)_2 \cdot MgA$ from $FeCl_2$ and $NiCl_2$, respectively, and Mg powder, optionally in the presence of activators

| Example No. | $M^1X_m$ g (mmoles) | Mg Powder[a] [mmoles] | $M^1$:Mg Atomic Ratio | Activator (mmoles) | THF [ml] | Reaction Time at RT [hours] | $M^1$ [%] in Soln.[b] | $H_2/M^1$ after Protolysis | Procedure and Work-up |
|---|---|---|---|---|---|---|---|---|---|
| 28 | $FeCl_2$ (19.9) | 200 | 1:10 | — | 130 | 19 | 13.6 | 1.52 | cf. Test Example 28 |
| 29 | $FeCl_2$ (19.9) | 200 | 1:10 | Quinuelidine (26) | 130 | 19 | 28.9 | 1.56 | Same as Example 28 |
| 30 | $NiCl_2 \cdot 1.5$ THF (27) | 823 | 130 | $(CH_2Br)_2$[c] | 67 | | 23.7 | 1.48 | Same as Example 28 |
| 31 | $NiCl_2 \cdot 1.5$ THF (16.1) | 411 | 1:25 | — | 100 | 5 | 33.0[e] | 1.49 | Same as Example 28 |
| 32 | $NiCl_2 \cdot 0.9$ THF (10.2) | 823 | 1:81 | Anthracene (10) | 100 | 3 | 64.7 | 2.2 | cf. Test Example 32 |

[a] 270 mesh.
[b] After centrifugation of filtration.
[c] 0.05 ml.
[d] Reaction with $FeCl_2$, cf. Table 5a.
[e] Undissolved portion: 9.89 g (Mg 86.1 Ni 8.1, Cl 1.2%).

TABLE 5

Preparation of finely divided metal powders or alloys from $Mg_2Sn$, $Pd(MgCl)_2$ or $Pt(MgCl)_2$ and metal halides $M^1Cl_m$ or $M^2Cl_n$

| Example No. | $M^1$Mg-Compon. (mmoles of $M^1$) | $M^1$Mg in ml of THF | $M^1Cl_m$ or $M^2Cl_n$ (mmoles) | $M^1$:$M^2$ Atomic Ratio | React. Temp. [°C.]/React. Time[h][a] | Solid Material [g] | Composition [%] $M^1$ $M^2$ C H Cl Empirical Formula |
|---|---|---|---|---|---|---|---|
| 1 | $Mg_2Sn$ + Sn (8.2) | 97 | $SnCl_2$ (8.2) | 1:1 | RT/7 | | |
| 3B | $Mg_2Sn$ (13.1) | 150 | $CuCl_2$ (25.9) | 1:2 | RT/82 | 3.18 | 47.6 41.5 2.4 3.6 0.5 1.9 $Cu_{1.62}SnMg_{0.25}$ |
| 13 | $Pd(MgCl)_2$ (1.32) | 56 | $PdCl_2$ (1.65) | | RT/3–4 days | 0.16 | 89.1 0.04 3.9 2.7 4.1 |
| 13 | $Pd(MgCl)_2$ (4.51) | 90 | $SnCl_2$ (4.50) | 1:1 | RT/3–4 days | 1.02 | 43.5 42.8 2.0 5.9 1.0 4.6 $Pd_{1.13}SnMg_{0.23}C_{1.36}H_{2.72}Cl_{0.36}$ |
| 20 | $Pt(MgCl)_2$ (6.15) | 100 | $SnCl_2$ (5.65) | 1.09:1 | RT/48 h | 2.03 | 59.6 33.7 1.1 3.5 0.7 0.7 $Pt_{1.08}SnMg_{0.16}CH_{2.52}Cl_{0.07}$ |

| Example No. | X-ray Powder Analysis | $M^1$:Mg:Cl:$M^2$ in solution per mole of $M^1$ used | Procedure and Work-up |
|---|---|---|---|
| 1 | Sn | | cf. Text Example 1 |
| 3B | b) | 1.57 | cf. Text Example 3B |
| 13 | | | cf. Text Example 13 |
| 13 | amorphous[c] | 1.94:3.90 | cf. Text Example 13 |
| 20 | PtSn[d] | 0.01:2.18:3.74:0.01 | Same as $Pd(MgCl)_2$ + $SnCl_2$ Example 13 |

[a] After completion of the addition of $M^1Cl_m$ or $M^2Cl_n$. -
[b] Besides weak Sn reflections there are numerous reflections which have not yet been assigned. -
[c] Even after annealing at 800° C. for 24 hours. -
[d] Amorphous; crystalline only after annealing at 700° C. for 24 hours.

TABLE 5a

Preparation of finely divided metal powders or alloys from THF-soluble $M^1$-Mg (hydride) halides or halides $Fe(HMgCl)_2$, $Co(HMgCl)_2$ and $Ni_2Mg_3Cl_4$ and metal halides ($M^1Cl_m$ or $M^2Cl_n$)

| Example | $M^1$Mg-(hydride) halide (mmoles | THF | $M^1Cl_m$ or $M^2Cl_n$ | $M^1$:$M^2$ Atomic | React. Temp. [°C.]/React. | $H_2/-$ | Solid Material |
|---|---|---|---|---|---|---|---|

TABLE 5a-continued

Preparation of finely divided metal powders or alloys from THF-soluble $M^1$-Mg (hydride) halides or halides $Fe(HMgCl)_2$, $Co(HMgCl)_2$ and $Ni_2Mg_3Cl_4$ and metal halides ($M^1Cl_m$ or $M^2Cl_n$)

| No. | of $M^1$) | [ml] | (mmoles) | Ratio | Time[h][a] | $M^1$ | [g] |
|---|---|---|---|---|---|---|---|
| 21 | $Fe(HMgCl)_2$ (17.3) | 81 | $FeCl_2$ (18.9) | 0.92:1 | -78 RT/5 | 0.84 | |
| 21 | $Fe(HMgCl)_2$ (60.4) | 2676 | $CoCl_2$ (58.2) | 1.04:1 | RT/ | 0.98 | 9.7 |
| 21 | $Fe(HMgCl)_2$ (14.7) | 40 | $NiCl_2$ (14.7) | 1:1 | -78/5 -78 RT/6 RT/3 | 0.74 | 1.83 |
| 21 | $Fe(HMgCl)_2$ (18.4) | 100 | $CuCl_2$ (18.6) | 1:1 | -78/5 -78 RT/6 RT/3 | 0.93 | 2.20 |
| 22 22a | $Co(HMgCl)_2$ (40.6) | 140 | $FeCl_2$ (44.8) | 0.91:1 | -78 RT/ | 0.77 | |
| 23 | $Ni(HMgCl)_2$ (12.3) | 47 | $NiCl_2 \cdot 1.5$ THF (12.0) | 1:1 | -78 RT/20 | 0.45 | 1.38 |
| 23 | $Ni(HMgCl)_2$ (11.6) | 35 | $CoCl_2$(10.8) | 1.07:1 | -78 RT/19 | 0.42 | 1.33 |
| 30 | $Ni_2Mg_3Cl_4$ | | $FeCl_2$ | | | | |

| Example No. | Composition [%] $M^1$ $M^2$ Mg C H Cl Empirical Formula | X-ray Powder Analysis | $M^1$:Mg:Cl:$M^2$ in solution per mole of $M^1$ | Procedure and Work-up |
|---|---|---|---|---|
| 21 | | | Trace:2.2:4.2 | b) |
| 21 | 31.8 32.0 3.1 9.5 1.7 12.1 | FeCo | Trace:1.8:3.5:0.01 | c) |
| 21 | $Fe_{1.05}CoMg_{0.23}C \ldots H_{0.16}Cl_{0.63}$ 39.4 41.9 1.2 9.2 1.9 2.7 | | 0.05:2.0:4.1:0.03 | b) |
| 21 | $FeNiMg_{0.07}C_{1.07}H_{2.7}Cl_{0.1}$ 35.0 46.0 0.9 7.9 1.1 3.8 | | 0.15:1.9:4.1:0.14 | b) |
| 22 22a | $Fe_{0.87}CuMg_{0.05}C_{0.91}H_{1.4}Cl_{0.15}$ | FeCo FeCo | 0.01:2.0:3.9:0.0 | b) |
| 23 | 77.8 3.6 3.3 | | 0.1:2.0:4.0 | b) |
| 23 | 42.6 42.7 3.5 4.9 2.0 4.1 | amorphous | 0.01:2.1:4.2:0.11 | b) |
| 30 | $NiCoMg_{0.2}C_{0.56}H_{2.75}Cl_{0.16}$ | $FeNi_2$ | | |

[a] After completion of the addition of $M^1Cl_m$ or $M^2Cl_n$. -
b) In the same manner as $Pd(MgCl)_2 + SnCl_2$ in Example 14. -
c) In this case the solution of $Fe(HMgCl)_2$ in 176 ml of THF was dropwise added within 6.5 hours to the stirred solution of $CoCl_2$ in 2.5 liters of THF.

TABLE 6

Preparation of MgAu, MgHg, and MgPb intermetallics from magnesium anthracene - 3 THF (MgA) and metal chlorides ($MX_n$) in THF

| Example No. | MgA g (mmole) | $MX_n$ g (mmole) | Mg:M ratio | THF [ml] | react. time [h] | isol. solid [g] | composition [%] Mg M C H Cl formula | spec. surface [m²/g] | X-ray diffr. |
|---|---|---|---|---|---|---|---|---|---|
| 35 | 9.2 (23) | $AuCl_3$ 1.65 (5.4) | 4.2:1 | 70 | 22 | 1.20 | 13.8 67.7 11.1 1.5 1.5 $Mg_{1.65}Au$ | 73.4 | MgAu[1] |
| 36 | 5.8 (14) | $HgCl_2$ 1.06 (3.9) | 3.7:1 | 40 | 120 | 0.82 | 12.1 75.8 6.0 0.6 0.1 $Mg_{1.32}Hg$ | 12.1 I | MgHg |
| 37 | 6.8 (17) | $PbCl_2$ 1.51 (5.4) | 3.1:1 | 70 | 120 | 1.31 | 17.2 80.4 1.5 0.2 0.3 $Mg_{1.83}Pb$ | 6.0 | $Mg_2Pb$ +Pb |

[1] After heating the sample under argon to 400° C. for 24 h

We claim:

1. The method for the production of a soluble metal-magnesium compound of the formula $M^1$-Mg-halide or $M^1$-hydride-Mg halide in which $M^1$ is a metal of Group III A-VA, VB-VIIB, VIII, IB or IIB of the Periodic Table, comprising by in a first step reacting the metal $M^1$ or a halide or hydride thereof in an organic solvent with at least one magnesium-containing member selected from the group consisting of magnesium hydride ($MgH_2$), a hydridemagnesium halide (HMgX), an organomagnesium compound and metallic magnesium, at least one of the $M^1$-component or the magnesium component containing a halide ion, optionally in the presence of at least one activator selected from the group consisting of anthracene or a derivative thereof, magnesium· 3 THF (MgA) or a derivative thereof, a magnesium halide, an organic halide and quinuclidine, and in a second step reacting such compound with an $M^1$ halide.

2. The method according to claim 1, wherein the second step is carried out in a solvent.

3. The method according to claim 1, wherein the metal $M^1$ in the second step is different than the metal $M^1$ in the first step.

* * * * *

UNITED STATES PATENT AND TRADEMARK OFFICE
CERTIFICATE OF CORRECTION

PATENT NO. : 5,498,402
DATED : March 12, 1996
INVENTOR(S) : Bogdanovic, e.t al.

It is certified that error appears in the above-indentified patent and that said Letters Patent is hereby corrected as shown below:

Title Page    Insert -- [*] Notice: The term of this patent shall not extend beyond the expiration date of Pat. No. 5,385,716. --

Col. 22, line 63    Delete " by "

Signed and Sealed this

Twenty-seventh Day of August, 1996

Attest:

BRUCE LEHMAN

Attesting Officer    Commissioner of Patents and Trademarks